US010804768B2

(12) United States Patent
Chambers et al.

(10) Patent No.: US 10,804,768 B2
(45) Date of Patent: Oct. 13, 2020

(54) WIND TURBINE HAVING RELEASABLE VANES

(71) Applicants: Justin R. Chambers, Glen Dale, WV (US); James E. Smith, Bruceton Mills, WV (US)

(72) Inventors: Justin R. Chambers, Glen Dale, WV (US); James E. Smith, Bruceton Mills, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 15/380,145

(22) Filed: Dec. 15, 2016

(65) Prior Publication Data

US 2018/0171970 A1 Jun. 21, 2018

(51) Int. Cl.
*F03D 3/04* (2006.01)
*H02K 7/18* (2006.01)
*F03D 9/25* (2016.01)
*F03D 3/06* (2006.01)

(52) U.S. Cl.
CPC ............ *H02K 7/183* (2013.01); *F03D 3/064* (2013.01); *F03D 9/25* (2016.05); *F05B 2240/213* (2013.01); *F05B 2270/1011* (2013.01); *Y02E 10/74* (2013.01)

(58) Field of Classification Search
CPC .......... F03D 3/0418; F03D 3/005; F03D 9/25; H02K 7/183
See application file for complete search history.

(56) References Cited

U.S. PATENT DOCUMENTS

| 2,665,054 | A  | * | 1/1954  | Fischer ............... F04D 29/362 |
|           |    |   |         | 415/129                            |
| 3,920,354 | A  | * | 11/1975 | Decker ................ F03D 3/067  |
|           |    |   |         | 416/117                            |
| 4,218,183 | A  | * | 8/1980  | Dall-Winther ......... F03D 3/067  |
|           |    |   |         | 416/119                            |
| 4,365,935 | A  | * | 12/1982 | Zukeran ................ F03D 7/06  |
|           |    |   |         | 416/117                            |
| 4,566,853 | A  | * | 1/1986  | Likitanupak ........... F03D 3/067  |
|           |    |   |         | 416/117                            |
| 4,818,180 | A  | * | 4/1989  | Liu .......................... F03D 7/06 |
|           |    |   |         | 416/117                            |
| 6,853,096 | B1 | * | 2/2005  | Yu .......................... F03D 3/067 |
|           |    |   |         | 290/43                             |
| 7,918,648 | B1 | * | 4/2011  | Simnacher ............. F03D 3/067  |
|           |    |   |         | 416/111                            |
| 7,946,802 | B1 | * | 5/2011  | Iskrenovic ........... F03D 3/0418  |
|           |    |   |         | 415/4.2                            |
| 8,087,894 | B2 | * | 1/2012  | Brooks ................. F03D 3/0409 |
|           |    |   |         | 290/55                             |
| 8,164,210 | B2 | * | 4/2012  | Boone .................... F03D 3/005 |
|           |    |   |         | 290/55                             |

(Continued)

*Primary Examiner* — Sean Gugger
(74) *Attorney, Agent, or Firm* — McDonnell Boehnen Hulbert & Berghoff LLP

(57) ABSTRACT

A wind turbine is disclosed. The wind turbine includes a shaft rotatable about an axis, a plurality of hubs fixedly attached to the shaft, and a plurality of vanes. The vanes are releasably engaged with each of the plurality of hubs. The vanes disengage from the hubs once the shaft rotates about the axis at a cut-out speed of the wind turbine. In another embodiment, the vanes are releasably engaged with the shaft.

13 Claims, 10 Drawing Sheets

(56) References Cited

U.S. PATENT DOCUMENTS

| | | | |
|---|---|---|---|
| 2003/0059306 A1* | 3/2003 | Miller | F03D 3/02 |
| | | | 416/132 B |
| 2004/0057829 A1* | 3/2004 | Khan | F03D 3/067 |
| | | | 416/17 |
| 2008/0075595 A1* | 3/2008 | Proven | F03D 3/064 |
| | | | 416/140 |
| 2008/0217924 A1* | 9/2008 | Boone | F03D 3/067 |
| | | | 290/55 |
| 2008/0296905 A1* | 12/2008 | Ferguson | F03D 3/002 |
| | | | 290/55 |
| 2009/0066088 A1* | 3/2009 | Liang | F03D 3/067 |
| | | | 290/55 |
| 2009/0180880 A1* | 7/2009 | Ersoy | F03D 3/067 |
| | | | 416/132 R |
| 2009/0185905 A1* | 7/2009 | Farb | F03D 1/04 |
| | | | 416/131 |
| 2013/0017083 A1* | 1/2013 | Graham | F03D 7/0232 |
| | | | 416/1 |
| 2014/0321989 A1* | 10/2014 | Chambers | F03D 1/0633 |
| | | | 415/148 |
| 2016/0131107 A1* | 5/2016 | Agtuca | F03D 7/0236 |
| | | | 416/147 |
| 2017/0138345 A1* | 5/2017 | Bahnmuller | F03D 7/06 |

\* cited by examiner

| Aspect Ratio | Number of Vanes | $\frac{e}{d}$ | SF |
|---|---|---|---|
| 2 | 3 | 0.24 | 1 |

WIND TURBINE HAVING RELEASABLE VANES

FIELD

The disclosed system relates to a wind turbine and, more particularly, to a wind turbine having a plurality of releasable vanes.

BACKGROUND

Wind turbines are an alternative source of energy that utilize wind energy to produce electrical power. A wind turbine includes a plurality of blades or vanes that transform the wind energy into rotational motion of a drive shaft. The rotational motion of the drive shaft may drive a rotor of an electrical generator, thereby producing electrical power. However, it is to be appreciated that the wind used to rotate the drive shaft may be intermittent. Furthermore, sometimes the speed of the wind may change suddenly. For example, sometimes a wind turbine may experience weather conditions that produce high-speed wind such as, for example, storms, gusty winds, or even tornados.

Those of ordinary skill in the art will readily appreciate that wind turbines cease to produce electrical power and shut down during high-speed wind conditions. The wind speed at which shut down of a wind turbine occurs may be referred to as the cut-out speed. The cut-out speed may vary based on the specific wind turbine, but typically ranges from about 45 miles per hour (mph) (72.4 kilometers per hour (kph)) to about 80 mph (128.7 kph). Shut down of a wind turbine may be accomplished in a number of ways. For example, in one approach, the wind turbine may include an automatic brake that is activated using a wind speed sensor. Alternatively, some other wind turbines may twist the blades of the wind turbine to achieve shut down. However, there exists a continuing need in the art for improved approaches for accommodating a wind turbine during high-speed wind conditions.

SUMMARY

In one aspect, a wind turbine is disclosed. The wind turbine includes a shaft rotatable about an axis, a plurality of hubs fixedly attached to the shaft, and a plurality of vanes. The vanes are releasably engaged with each of the plurality of hubs. The vanes disengage from the hubs once the shaft rotates about the axis at a cut-out speed of the wind turbine.

In another aspect, a wind turbine is disclosed. The wind turbine includes a shaft rotatable about an axis, and a plurality of vanes releasably engaged with the shaft. The vanes disengage from the shaft once the shaft rotates about the axis at a cut-out speed of the wind turbine.

Other objects and advantages of the disclosed system will be apparent from the following description, the accompanying drawings and the appended claims.

DETAILED DESCRIPTION

Figure 1:
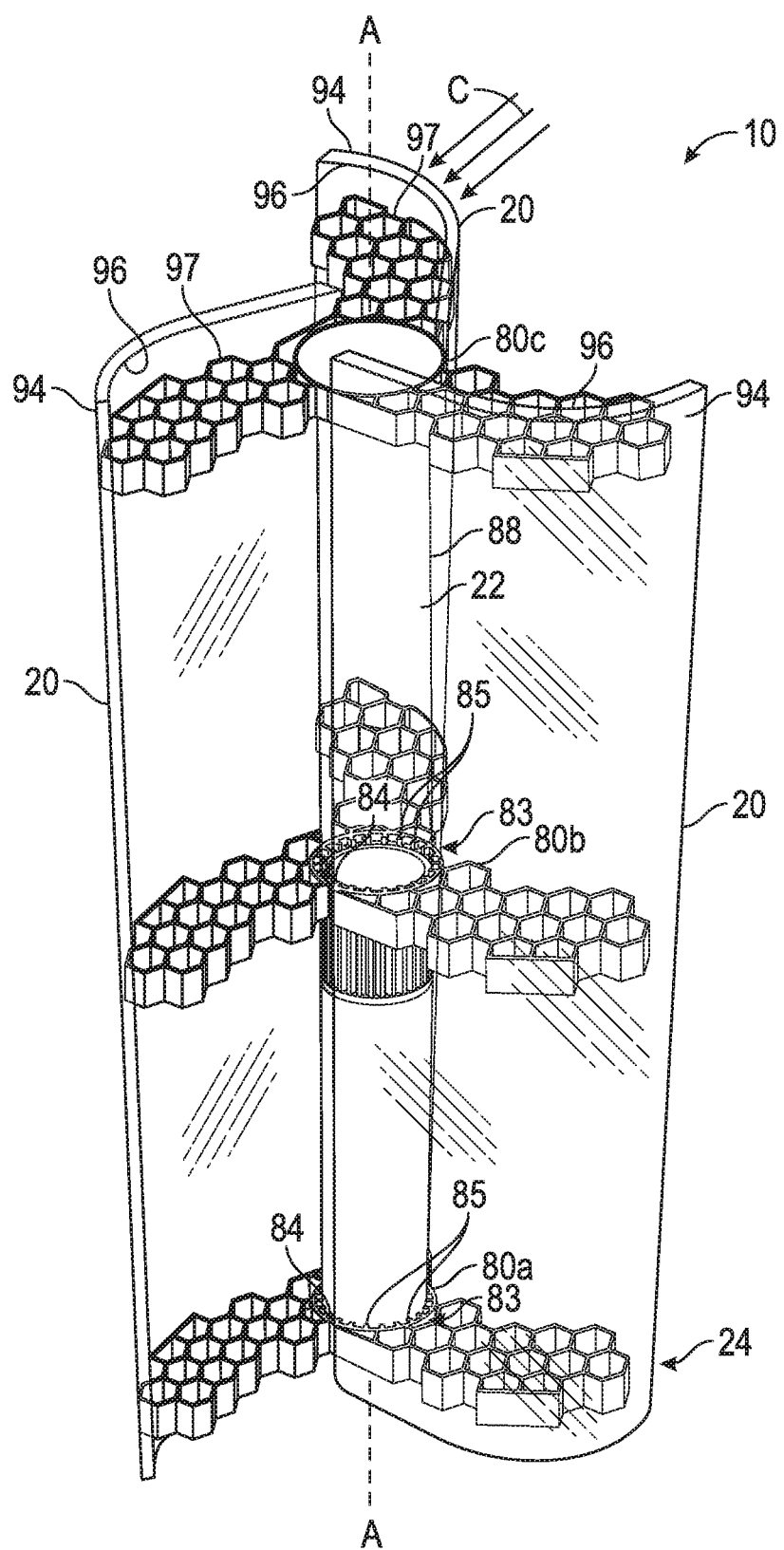
FIG. 1 is a perspective view of the disclosed wind turbine having a plurality of vanes and a shaft.

As shown in FIG. 1, the disclosed wind turbine 10 according to an aspect of the disclosure may include a plurality of vanes 20 that are driven by the wind in order to rotate about a central axis A-A of a rotatable shaft 22. The wind turbine 10 may be secured to a ground surface by a pole or a tripod (not illustrated). Specifically, a bottom end portion 24 of the shaft 22 may be mounted to the pole or tripod that secures the wind turbine 10 to the ground. In the embodiment as illustrated, the wind turbine 10 is a vertical axis wind turbine. That is, the central axis A-A of the wind turbine 10 about which the vanes 20 rotate is positioned substantially vertical or transverse to the direction of wind. However, it is to be appreciated that the present disclosure is not limited to a vertical axis wind turbine, and in another embodiment the wind turbine may be a horizontal axis wind turbine as well.

Figure 2:
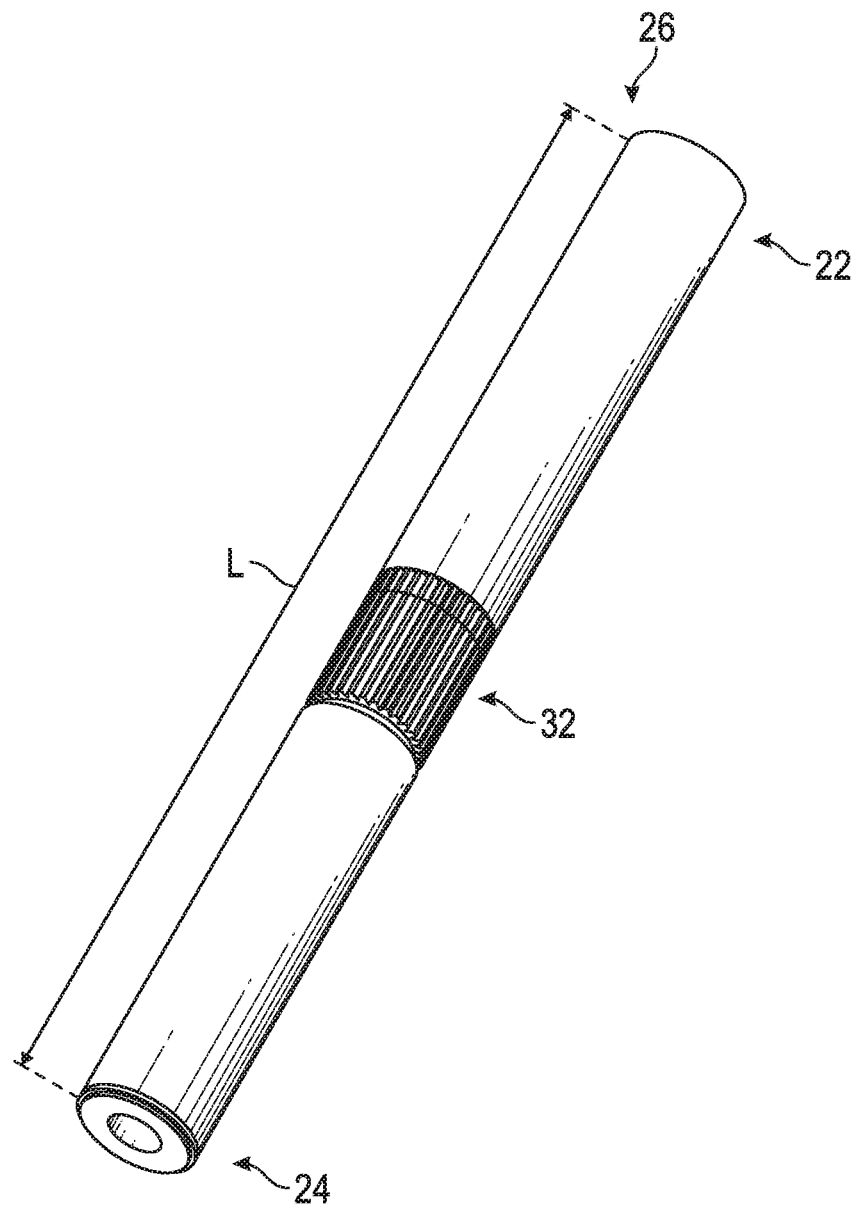
FIG. 2 is a perspective view of the shaft of the wind turbine shown in FIG. 1.
Figure 4:
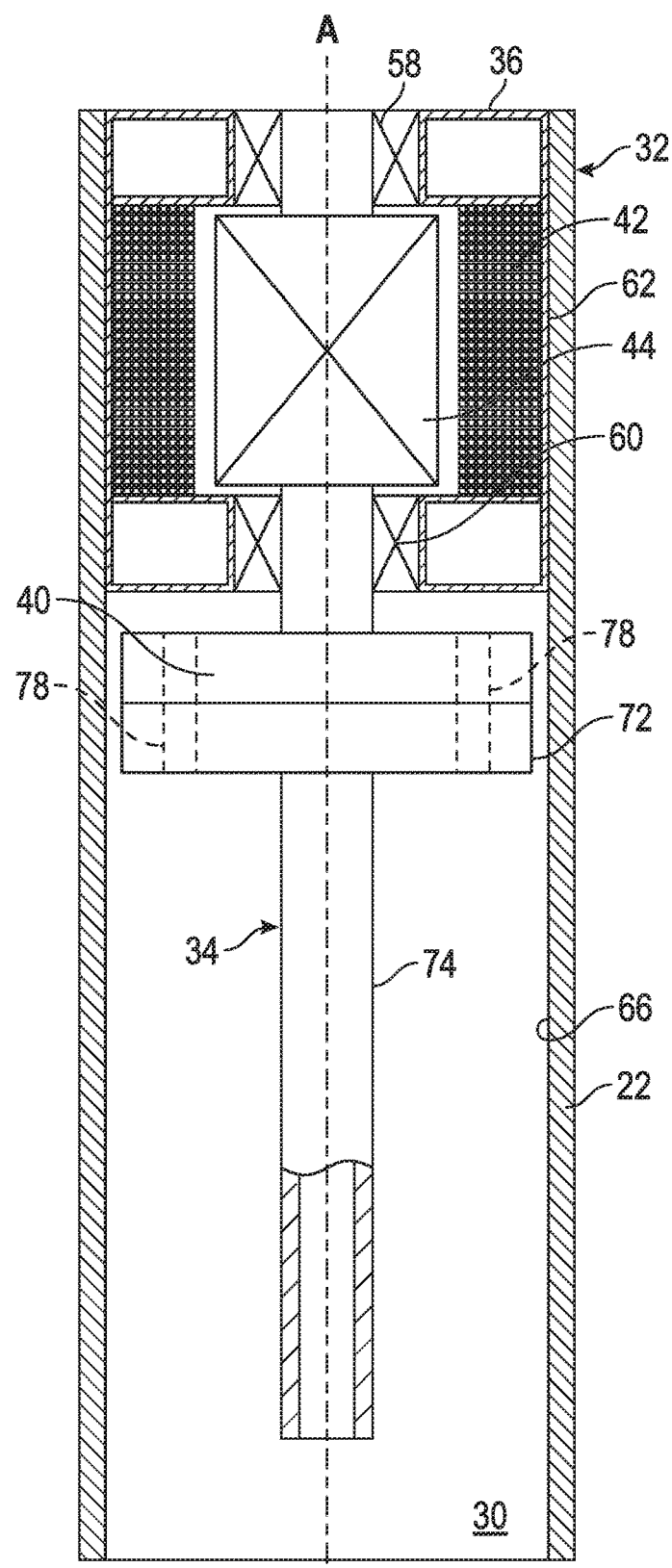
FIG. 4 is a cross-sectioned view of the shaft of the wind turbine shown in FIG. 1 illustrating a generator.

FIG. 2 is a perspective view of the shaft 22 shown in FIG. 1. The shaft 22 may define the bottom end portion 24 as well as an upper end portion 26. In the embodiment as illustrated, the shaft 22 is a single, unitary member, however it is to be appreciated that the present disclosure is not limited to a single, unitary shaft. The shaft 22 may be hollow to define a generally cylindrical cavity 30 (FIG. 4). FIG. 4 is a cross-sectioned view of the shaft 22 shown in FIG. 2. Referring now to both FIGS. 2 and 4, a generator 32 and a support structure 34 may be positioned within the cavity 30 of the shaft 22.

In the exemplary embodiment as shown in FIGS. 2 and 4, the generator 32 may have a generally cylindrical housing 36 and a base 40 that are centered along the axis A-A. The generator 32 may also include a stator 42 fixed to the housing 36 and a rotor 44 that is fixed relative to a base 40. The generator 32 may also include an upper bearing 58 and a lower bearing 60. In the embodiment as shown in FIG. 4, the housing 36 of the generator 32 may be press-fit within the shaft 22, where an outermost surface 62 of the housing 36 abuts against and is in frictional contact with an inner surface 66 defined by the cavity 30 of the shaft 22. The press-fit engagement between the housing 36 and the inner surface 66 of the shaft 22 may substantially prevent the housing 36 from rotating relative to the shaft 22 about the axis A-A. Thus, the housing 36 and the stator 42 of the generator 32 are coupled to the shaft 22. Although FIG. 4 illustrates a press-fit engagement, it is to be appreciated that this embodiment is merely an example of how the generator 32 may be coupled to the shaft 22. For example, in an alternative approach the generator 32 may be coupled to the shaft 22 using a fitting and rivet connection.

In the embodiment as shown in FIG. 4, the support structure 34 may include a support plate 72 and a support bar 74 that are aligned with the axis A-A. The support bar 74 may include a tubular shape. Fasteners 78 may be used to attach the support plate 72 to the base 40 of the generator 32. Thus, the support structure 34 may be suspended from the generator 32. The housing 36 and the stator 42 of the generator 32 are coupled to the shaft 22. Thus, the housing 36 and the stator 42 of the generator 32 may rotate in concert with the shaft 22 about the axis A-A. Referring to FIGS. 1, 2, and 4, when the wind turbine 10 is mounted to a pole or tripod (not illustrated in the figures) and is rotated by wind, the vanes 20 and the shaft 22 rotate about the axis A-A. The rotation of the shaft 22 may drive the stator 42 to rotate about the rotor 44 of the generator 32, which in turn generates electrical power. The electrical power created by the generator 32 may be provided to an electrical load (not illustrated) such as, for example, rechargeable batteries.

Turning back to FIG. 1, the vanes 20 may be releasably engaged with the shaft 22 of the wind turbine 10. In the embodiment as illustrated in FIG. 1, the vanes 20 may each be releasably engaged with the shaft 22 by a plurality of hubs 80, and is described in greater detail below. Alternatively, in another embodiment illustrated in FIGS. 10-14 and described below, the vanes 420 of the wind turbine 410 may be directly engaged with the shaft 422 of the wind turbine 410.

Referring back to FIG. 1, in the non-limiting embodiment as shown the wind turbine 10 includes three hubs 80. Specifically, a first hub 80a is positioned at the bottom end portion 24 of the shaft, a second hub 80b is positioned at a about midsection 82 of the shaft, and a third hub 80c is positioned at the upper end portion 26 of the shaft 22. It is to be appreciated that while FIG. 1 illustrates three hubs 80, this embodiment is merely exemplary in nature. Indeed, the wind turbine 10 may include two or more hubs 80. The hubs 80 may be fixedly attached to the shaft 22 using any number of approaches. For example, in the embodiment as shown the hubs 80 may each define an aperture 83 that defines an inner surface 84, where the aperture 83 is shaped to correspond with an outermost surface 88 of the shaft 22. A series of teeth 85 may be disposed along the inner surface 84 of the aperture 83. The teeth 85 may abut against the outermost surface 88 of the shaft 22 to create a press-fit engagement. However, those of ordinary skill in the art will readily appreciate that the hubs 80 may be fixedly attached to the shaft 22 using any number of approaches. For example, the hubs 80 may be attached to the shaft 22 using fasteners such as screws, or an adhesive.

Figure 3:
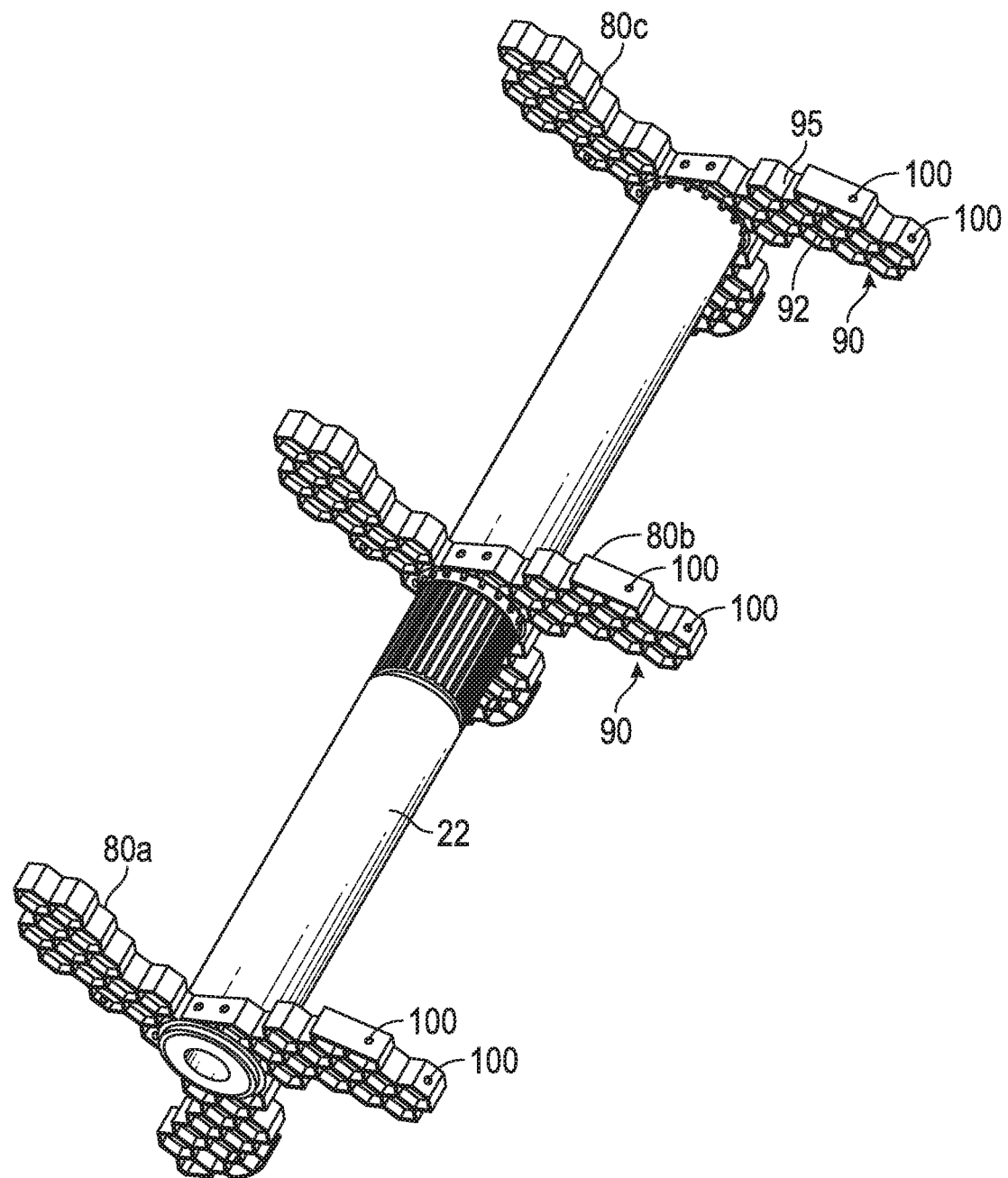
FIG. 3 is a perspective view of the shaft in FIG. 3 including a plurality of hubs.

In one embodiment, the hubs 80 may provide skeletal support for the vanes 20. As seen in FIG. 3, each hub 80 defines a skeletal support or frame 90 for providing shape to each of the vanes 20. Referring now to FIG. 3, the hubs 80 may be constructed of a relatively lightweight material. For example, in the embodiment as shown in FIG. 3, the hubs 80 may be constructed of a material that includes a honeycomb structure. The honeycomb structure may be defined by a plurality of hollow cells 92 that are defined by walls 95. The material of the hub 80 may be, for example, a lightweight plastic. Although FIG. 3 illustrates a honeycomb structure, it is to be appreciated that the hubs 80 are not limited to this particular structure. Indeed, the hubs 80 may be constructed from a variety of relatively lightweight materials such as, for example, aluminum, carbon fiber, and fiberglass.

Referring back to FIGS. 1 and 2, each vane 20 may extend along a length L of the shaft 22 (FIG. 2), and is releasably engaged with each of the hubs 80. Each vane 20 may be releasably attached to each of the hubs 80 using at least one releasable fastener (not visible in the figures). The releasable fasteners may be disposed along an outer surface 94 of each vane 20, and secure one of the vanes 20 to a specific hub 80. Specifically, the releasable fasteners may be disposed along the outer surface 94 of each vane 20 in a location where an inner surface 96 of the vane 20 and a side surface 97 of a hub 80 oppose one another. It is to be appreciated that the vanes 20 may be constructed a relatively flexible material, thereby allowing the vanes 20 to conform to and take the shape of the frame 90 of the hubs 80. Specifically, in the embodiment as shown the vanes 20 take the shape of the relatively curved profile of the side surfaces 97 of the hubs 80. The vanes 20 may be constructed of a variety of different materials such as, but not limited to, plastic, rubber, cloth, or metal. For example, in the embodiment as shown in FIG. 1, the vanes 20 include a relatively flat profile and are constructed of a flexible polycarbonate sheet.

One example of a releasable fastener is a ribbed shank rivet, which may also be referred to as a Christmas tree fastener. The ribbed shank rivet may be constructed of a relatively flexible material such as, for example, nylon. Some other examples of releasable fasteners include, but are not limited to, nylon rivets, snap fasteners, clips, snap features, or VELCRO®. As seen in FIG. 3, the hubs 80 may define apertures 100 along the side surface 97 of each hub 80. The apertures 100 may be shaped to receive the shank of one of the releasable fasteners (not illustrated).

Referring to FIGS. 1 and 3, the releasable fasteners may be used to secure the vanes 20 to the hubs 80 until a threshold or predetermined force is exerted upon the vanes 220. The predetermined force may be based on a centripetal force C (FIG. 1) that is experienced along the outer surface 94 of the vanes 20 as the shaft 22 rotates about the axis A-A, as well as any force created as wind flows over the vanes 20. As seen in FIG. 1, the centripetal force C may act in a direction that is substantially perpendicular to the outer surface 94 of each vane 20. If the shaft 22 rotates about the axis A-A at a cut-out speed of the wind turbine 10, then the centripetal force C created by rotation of the shaft 22 and the force created by the flow of wind combined may be sufficient to cause the releasable fastener to disengage from a corresponding vane 20 and hub 80. One example of the force sufficient to disengage the releasable fastener would be from about 3 to about 9 Newton, assuming 9 fasteners per vane. Specifically, at a 45 mph cut-out speed the wind load exerted on a single vane 20 would be about 28 Newton, thus each fastener would release at about 3 Newton. At 85 mph a load of about 96 Newton would be exerted on each vane 20. Thus each fastener would release at about 9 Newton. Those of ordinary skill in the art will readily appreciate that the cut-out speed may represent the speed at which the wind turbine 10 ceases to produce electrical power and shuts down due to during high-speed wind conditions.

Once the releasable fasteners disengage from their corresponding vane 20 and hub 80, the vanes 20 are no longer secured to the hubs 80. Thus, the vanes 20 are released from the hubs 80. In one exemplary embodiment, if the vanes 20 are constructed of a flexible material such as, for example, polycarbonate sheets then the vanes 20 may relax and regain their relatively flat profile once they are released from the hubs 80. A user may then re-attach the vanes 20 to the hubs 80 using releasable fasteners.

Figure 5:
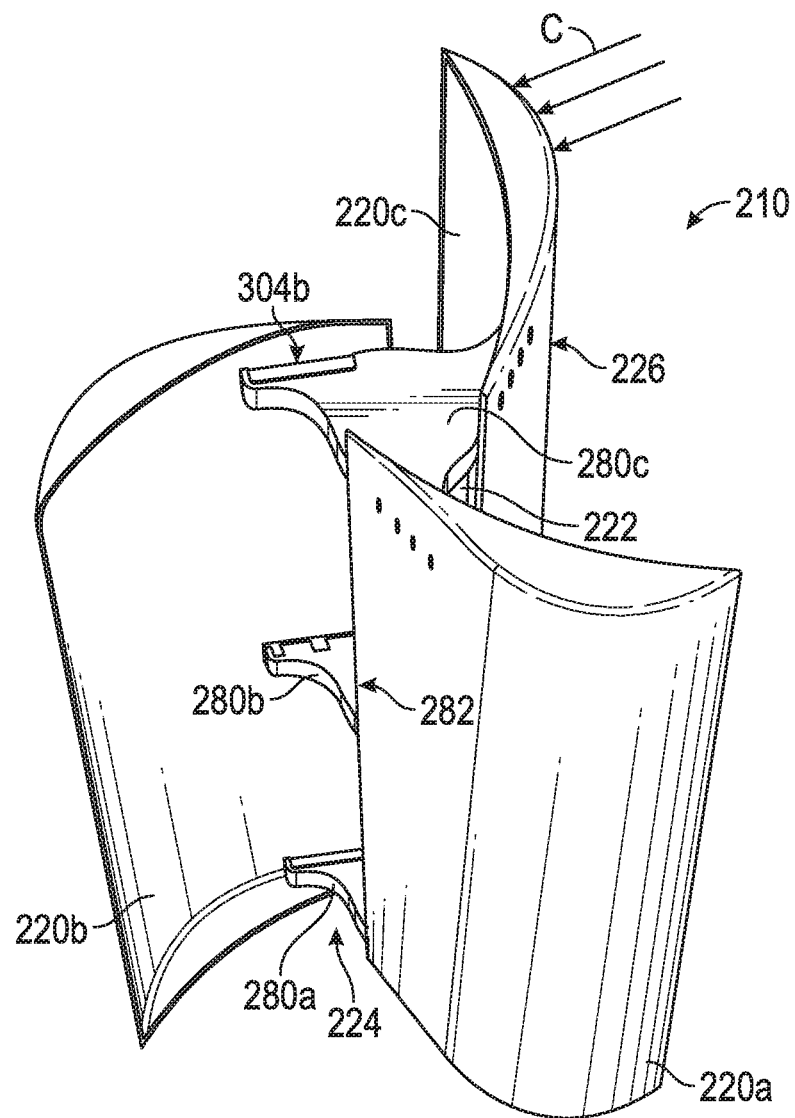
FIG. 5 is an elevated perspective view of another embodiment of a wind turbine.

FIG. 5 is an elevated view of another embodiment of a wind turbine 210 including three vanes 220a, 220b, 220c. Similar to the embodiment as described above and shown in FIGS. 1-4, the wind turbine 210 may include a generator (not visible in FIG. 5) positioned within a shaft 222. In the embodiment as shown in FIG. 5, the vanes 220 are each a single, unitary part constructed of a relatively rigid material such that the vanes 220 may not bend or flex out of their original shapes. That is, unlike the embodiment as shown in FIGS. 1-4, the vanes 220 are not flexible, and do not conform to the shape of a frame. Each vane 220 is secured to the shaft 222 by the hubs 280. In the non-limiting embodiment as shown in FIG. 5, three hubs 280 are shown, where a first hub 280a is positioned at a bottom end portion 224 of the shaft, a second hub 280b is positioned at about a midsection 282 of the shaft 222, and a third hub 280c is positioned at an upper end portion 226 of the shaft 222. It is to be appreciated that while FIG. 5 illustrates the wind turbine 210 having three hubs 280, this embodiment is merely exemplary in nature.

Figure 6:
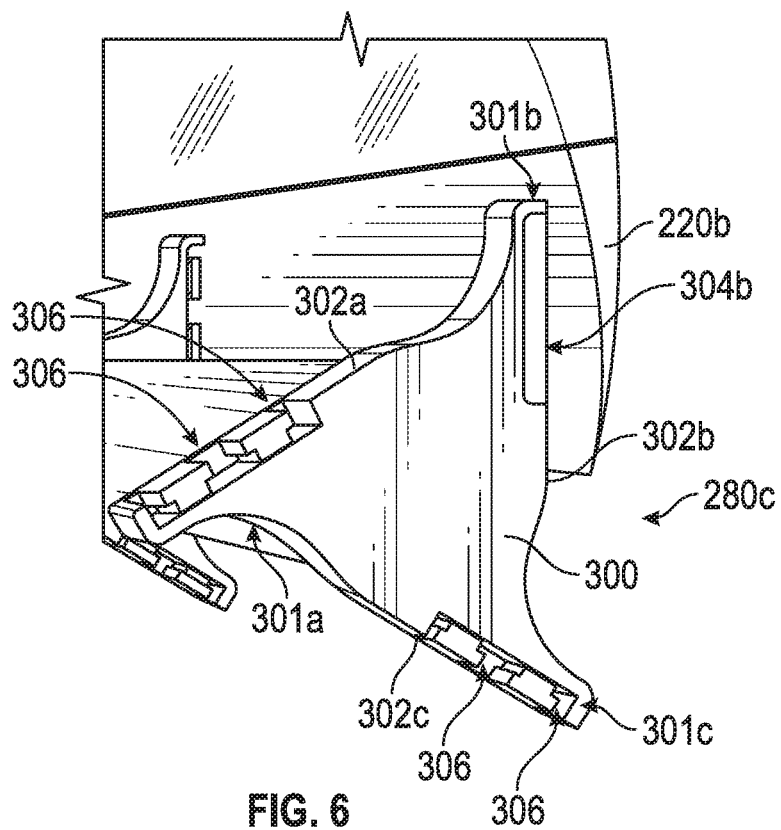
FIG. 6 is an enlarged view of a hub of the wind turbine shown in FIG. 5.

FIG. 6 is an enlarged view of a front face 300 of the hub 280c shown in FIG. 5.

Figure 7:
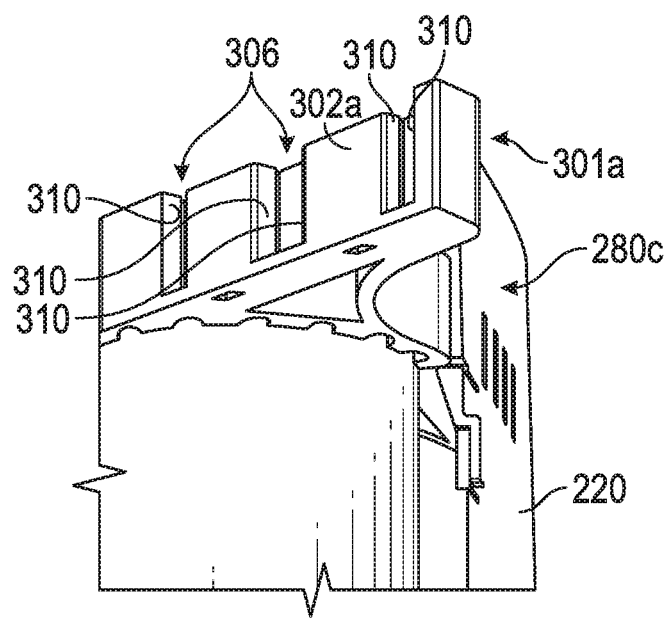
FIG. 7 is an enlarged view of the hub of the wind turbine shown in FIG. 5, illustrating a plurality of grooves along a surface of the hub.
Figure 8:
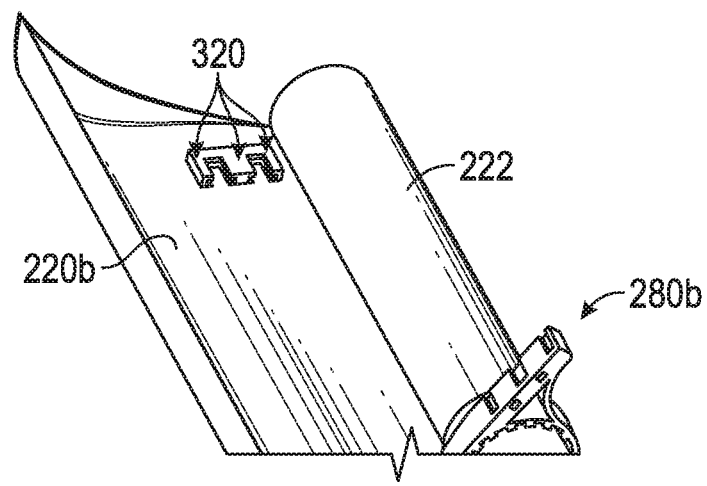
FIG. 8 is an enlarged view of one of the vanes of the wind turbine shown in FIG. 5.
Figure 9:
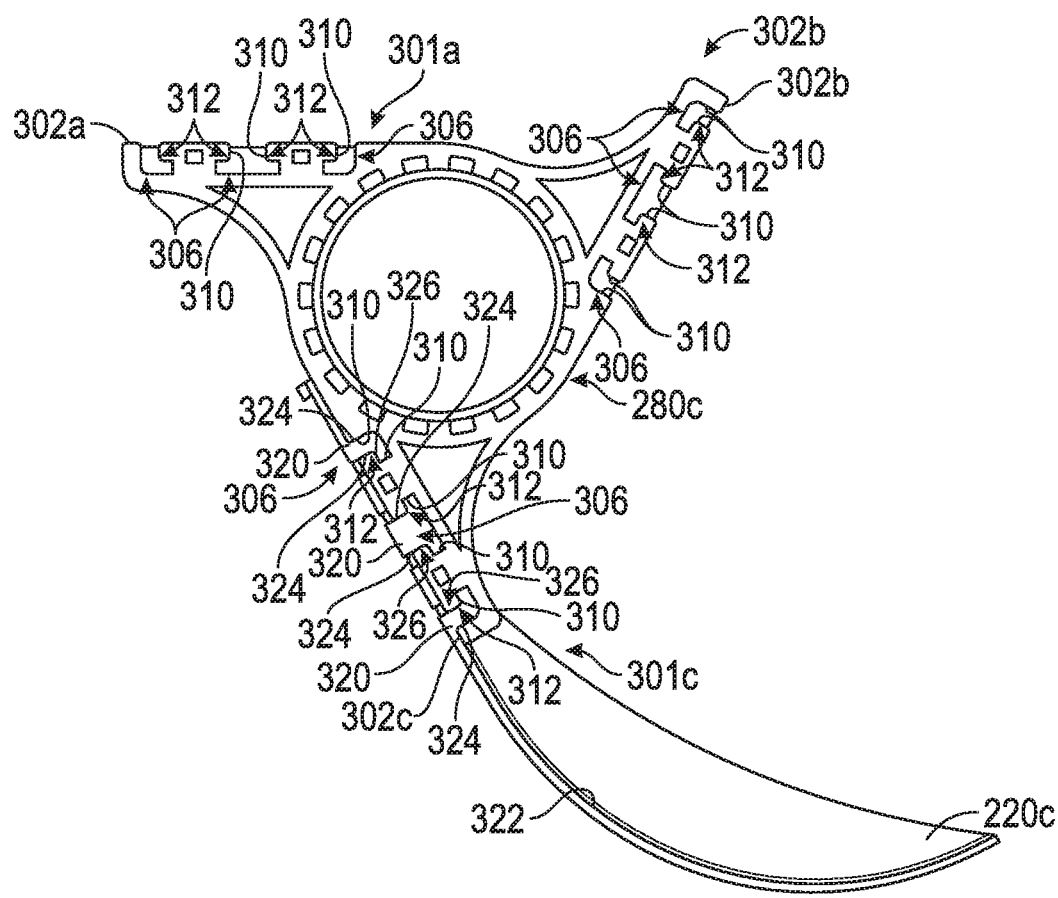
FIG. 9 is a cross-sectioned view of the shaft, the hub, and one of the vanes of the wind turbine shown in FIG. 5, where the vane is in snap-fit engagement with a corresponding hub.
Figure 10:
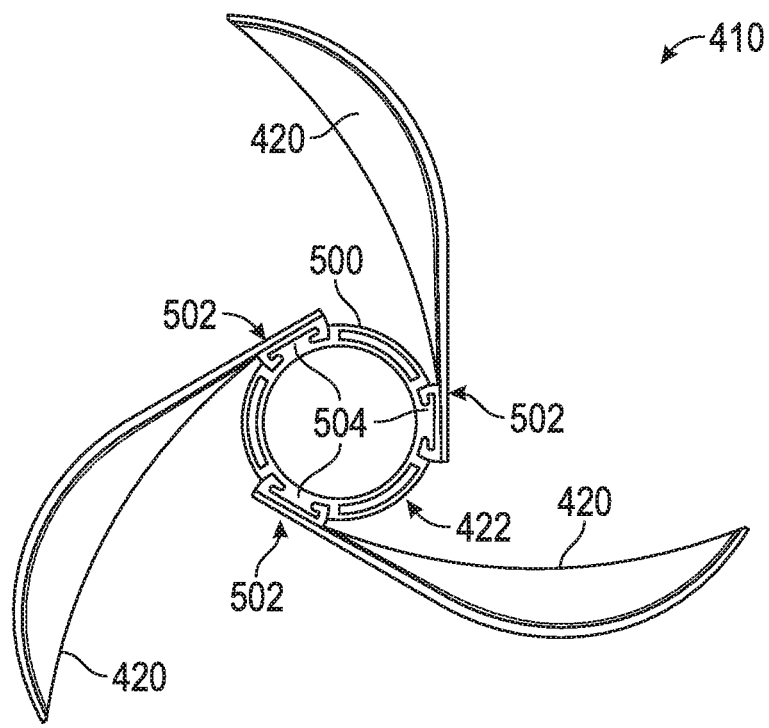
FIG. 10 is a cross-sectioned view of another embodiment of the wind turbine.
Figure 11:
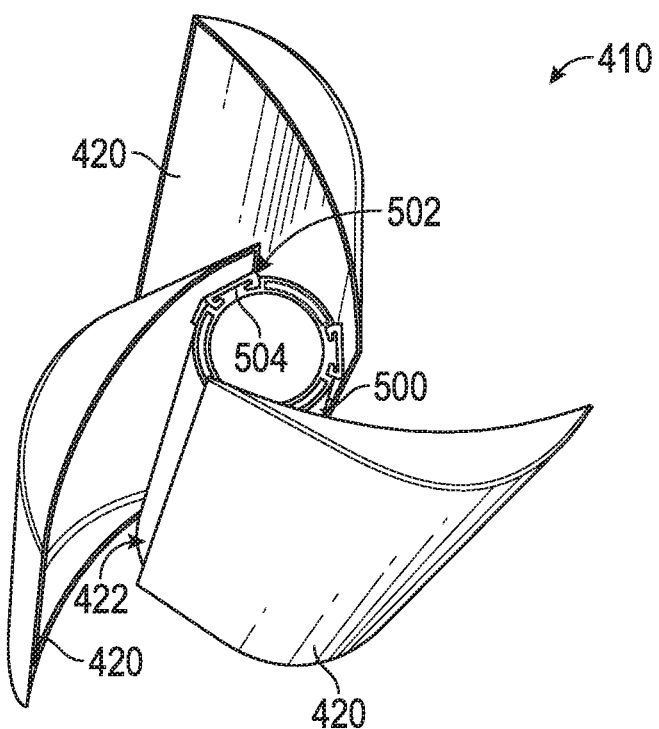
FIG. 11 is an elevated view of the wind turbine shown in FIG. 10
Figure 12:
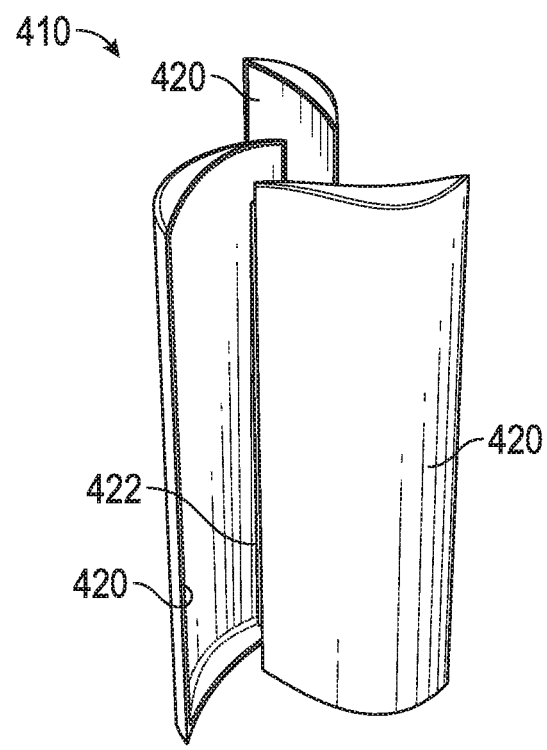
FIG. 12 is another view of the wind turbine shown in FIG. 10.
Figure 13:
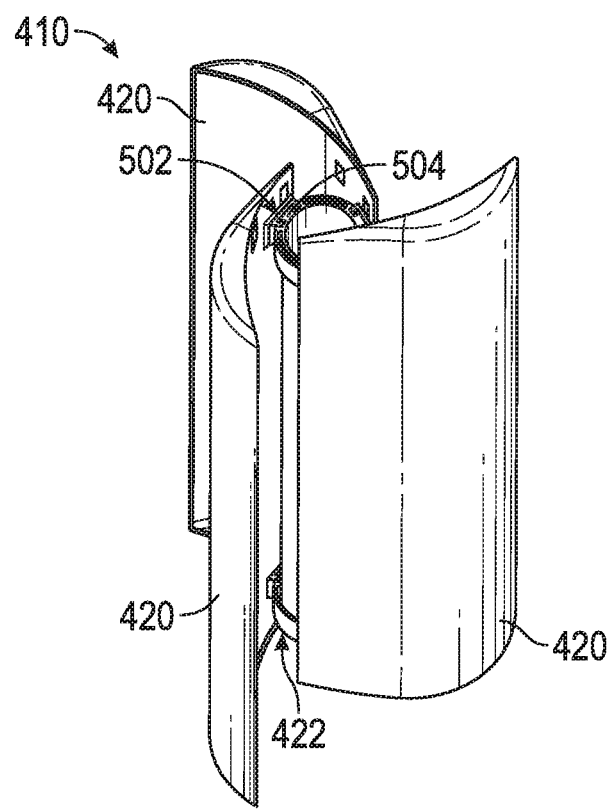
FIG. 13 is yet another view of the wind turbine shown in FIG. 10.

Although FIG. 6 illustrates only the hub 280c, it is to be appreciated that the remaining hubs 280a and 280b include a similar structure as well. FIG. 7 is an enlarged view of a side surface 302a of the hub 280c shown in FIG. 6. Referring now to FIGS. 5, 6, and 9, the hub 280c of may define three arms 301a, 301b, 301c. Each arm 301a, 301b, 301c may define a respective side surfaces 302a, 302b, and 302c. Each arm 301a, 301b, 301c corresponds to one of the vanes 220a, 220b, 220c. For example, arm 301a corresponds to the vane 220a, arm 301b corresponds to the vane 220b, and arm 301c corresponds to the vane 220c. Each vane 220a, 220b, 220c defines a corresponding slot 304a, 304b, 304c shaped to receive a portion of one of the arms 301a, 301b, 301c (only slot 304b is visible in FIGS. 5-6). As explained in greater detail below, the vanes 220a, 220b, 220c may each be releasably engaged with a corresponding arm 301a, 301b, 301c of the hub 280c using a snap-fit engagement.

Referring now to FIGS. 6-9, each surface 302a, 302b, 302c of the hub 280c may define one or more grooves 306. The grooves 306 may each define a pair of opposing sides 310. One or both of the sides 310 of each groove 306 may define a step 312. The grooves 306 defined along each surface 302a, 302b, 302c of each arm 301a, 301b, 301c may be shaped to engage with corresponding projections 320 located along an inner surface 322 of a corresponding one of the vanes 220a, 220b, 220c (the projections 320 of the vane 220b are visible in FIG. 8). FIG. 9 is a cross-sectioned view of the hub 280c and the vane 220c releasably engaged with one another using a snap-fit engagement. Specifically, as seen in FIG. 9, the projections 320 along the inner surface 322 of the vane 220c define a pair of opposing sides 324, where one or both sides 324 of the projection 320 may define a step 326. It is to be appreciated that the stepped profile of the projections 320 of the vane 220c are shaped to correspond with the stepped profile of the grooves 306 defined by the arm 301c of the hub 280c to create the snap-fit engagement.

Similar to the embodiment as shown in FIGS. 1-4, the snap-fit engagement may releasably secure the hubs 280a, 280b, 280c to the vanes 220a, 220b, 220c until the predetermined force is exerted upon the vanes 220a, 220b, 220c. The predetermined force may be based on the centripetal force C exerted along the outer surface 94 of the vanes 220 (FIG. 5) as the shaft 222 rotates about the axis A-A, as well as any force created as wind flows over the vanes 220a, 220b, 220c. Indeed, as seen in FIG. 5 the force created by the flow of wind may act in a direction that is substantially perpendicular to one of the vanes 220. Once the vanes 220 rotate about the shaft 222 at the cut-out speed of the wind turbine 210, the centripetal force created by rotation of the shaft 222 and the force created by the flow of wind combined may be sufficient to cause the snap-fit engagement (FIG. 9) created between the vanes 222a, 222b, 222c and the hub 280a, 280b, 280c to disengage, thereby releasing the vanes 222a, 222b, 222c. In one example, at 45 mph the load exerted on one vane 220 would be about 28 Newton. Assuming three hubs 280 per vane 220, the force required to disengage the snap-fit feature would be about 9 Newton. At about 85 mph each vane 220 may experience a load of about 96 Newton. Thus, the force required to disengage the snap-fit feature would be about 32 Newton per hub 280.

FIGS. 10-14 illustrate another embodiment of the wind turbine 410. In the embodiment as shown, the wind turbine 410 includes the plurality of vanes 420 and the shaft 422. The wind turbine 410 may include a generator (not visible in FIGS. 10-12) positioned within the shaft 422. Similar to the embodiment as shown in FIGS. 5-9, the vanes 420 are each a single, unitary part and are constructed of a relatively rigid material such that the vanes 420 may not bend or flex out of their original shapes. In the embodiment as shown, the shaft 422 may be an extruded part having a fixed cross-section profile (seen in FIG. 11). The shaft 422 may define an outermost surface 500, where a plurality of attachment features 502 are disposed around the outermost surface 500. The attachment features 502 may be used to releasably engage one of the vanes 420 directly to the shaft 422, and is described in greater detail below.

Figure 14:
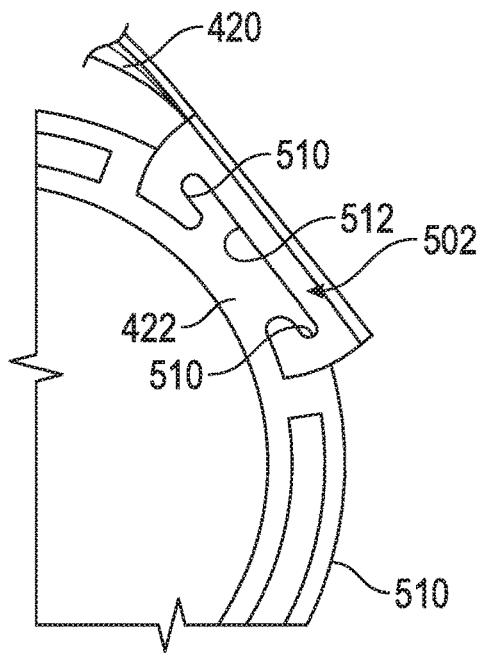
FIG. 14 is an enlarged view of an attachment feature of the shaft shown in FIGS. 10-13 releasably engaged with one of the vanes.

In the non-limiting embodiment as shown in FIGS. 10-13, the attachment features 502 of the shaft 422 are each a projection 504 that defines a dovetail feature. FIG. 14 is an enlarged view of one of the attachment features 502 of the shaft 422 releasably engaged with one of the vanes 420. In the embodiment as shown, the projection 504 of the shaft 422 defines two sides 510 that are sloped inwardly towards the outermost surface 500 of the shaft 422. The vane 420 defines a corresponding groove 512 that is shaped to engage with the projection 504 of the shaft 422. It is to be appreciated that the shaft 422 and the vane 420 are releasably engaged with one another using a sliding dovetail joint. That is, the dovetail joint extends along the entire length of the vane 420 and the shaft 422 (seen in FIGS. 11-13).

Similar to the embodiments as shown in FIGS. 1-4 and 5-9, the dovetail joint may releasably secure the vanes 420 to the shaft 420, until the shaft 420 rotates at the cut-out speed and the predetermined force is exerted upon the vanes 420. Referring to FIGS. 10-14, once the vanes 420 rotate about the shaft 422 at the cut-out speed of the wind turbine 410, the centripetal force created by rotation of the shaft 422 and the force created by the flow of wind combined may be sufficient to cause the dovetail joint between one of the vanes 420 and the shaft 422 to disengage, thereby releasing the vanes 422. In one example, at 45 mph the load exerted on one vane 420 would be about 28 Newton. Thus, the force required to disengage the vane 420 feature would be about 9 Newton. At about 85 mph a load of about 96 Newton may be exerted on each vane 420. Thus, the force required to disengage one of the vanes 420 would be about 32 Newton.

Figure 15:
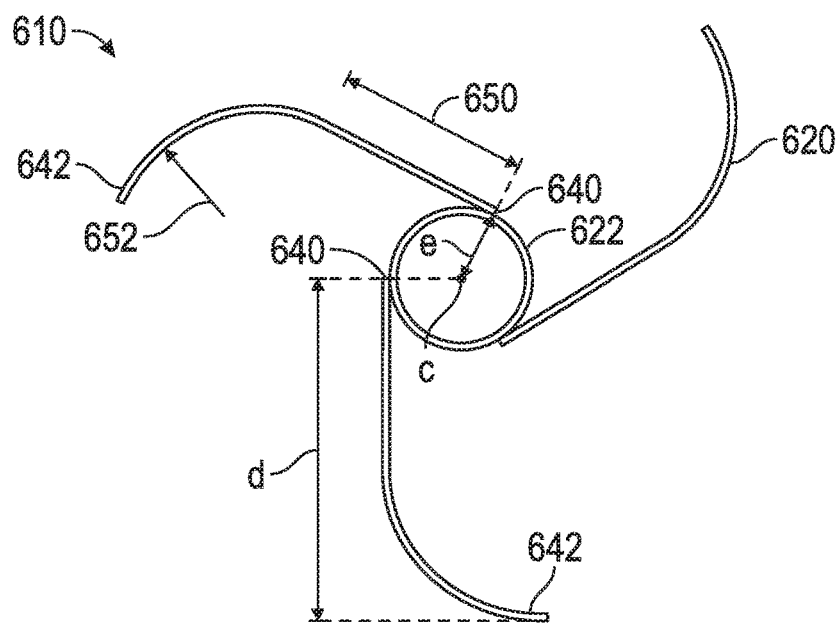
FIG. 15 is a schematic illustration of dimensions of the vanes and the hub that may be used with any of the wind turbines shown in FIGS. 1-14.

FIG. 15 is a schematic illustration of one embodiment of vanes 620 and a shaft 622 of a wind turbine 610. It is to be appreciated that the dimensions described in FIG. 15 may be applied to any of the wind turbines illustrated in FIGS. 1-14. In the embodiment as shown, e represents a distance measured from a center C of the shaft 622 and a leading edge 640 of a vane 620. Furthermore, d represents the mean chord of a vane 620. Those of ordinary skill in the art will readily appreciate that the mean chord is a line joining the leading edge 640 with a trailing edge 642 of a specific vane 620.

In the exemplary embodiment as shown in FIG. 15, the vanes 620 may have an aspect ratio of about 2. Those of ordinary skill in the art will readily appreciate that the aspect ratio of a vane may be determined by the equation AR=h/d, where AR is the aspect ratio, h is the height of the vane, and d is the mean chord of the vane. The vanes 620 may also include a shape factor of about 1. The shape factor is the ratio of length defining a straight portion 650 of the vane 620 and a radius of a curved portion 652 of the vane 620. Moreover, the turbine 610 may have e/d of about 0.24, where e/d represents a ratio of the separation of the vanes 620 to a radius d of the turbine 610.

Referring generally to FIGS. 1-15, technical effects and benefits of the disclosed wind turbine include a novel, cost-effective approach for accommodating high-speed wind conditions during operation of the wind turbine. Furthermore, it should also be appreciated that the vanes may be reusable. That is, once the vanes separate from the wind turbine at the cut-out speed, a user may then re-attach the vanes to the wind turbine.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A wind turbine, comprising: a shaft rotatable about an axis;
a plurality of hubs fixedly attached to the shaft, wherein each hub of the plurality of hubs includes at least one radially extending member, and wherein each hub includes an aperture shaped to correspond with an outer surface of the shaft;
a plurality of vanes releasably engaged with the plurality of hubs, wherein each vane of the plurality of vanes directly engages with one side of one of the radially extending members of each of the hubs,
wherein the shaft, hubs, and vanes are configured such that:
(a) rotation of the shaft about the axis creates and imparts centripetal force on the vane, and rotation of the shaft about the axis at a predetermined cutout speed of the wind turbine creates and imparts sufficient centripetal force on the vane to cause the vane to disengage from the hub, and
(b) when the vane disengages from the hub, the vane is also no longer secured to the shaft, and
(c) the plurality of vanes are configured to be engaged with the plurality of hubs, such that each vane may be re-attached to the hub after the vane has disengaged from the hub and is no longer secured to the shaft.

2. The wind turbine of claim 1, wherein each of the plurality of hubs defines a frame for defining a shape for each of the plurality of vanes.

3. The wind turbine of claim 1, wherein each of the vanes is releasably engaged with the hubs by a releasable fastener.

4. The wind turbine of claim 1, wherein each of the vanes is releasably engaged with the hubs by a snap-fit engagement.

5. The wind turbine of claim 1, wherein each of the vanes is constructed of a flexible material that allows the vane to conform to and take a shape of a frame of a hub of the plurality of hubs.

6. The wind turbine of claim 1, wherein each of the vanes is constructed of a rigid material.

7. The wind turbine of claim 1, further comprising a generator that includes a rotor, a stator, and a housing, wherein the housing and the stator of the generator are coupled to the shaft.

8. The wind turbine of claim 7, wherein the shaft defines an inner surface and the housing of the generator defines an outermost surface, and wherein the inner surface of the shaft is in press-fit engagement with the outermost surface of the housing.

9. The wind turbine of claim 1, wherein the wind turbine is one of a vertical axis wind turbine and a horizontal axis wind turbine.

10. The wind turbine of claim 1, wherein each of the plurality of vanes has an aspect ratio of about 2.

11. The wind turbine of claim 1, wherein each of the plurality of vanes has an aspect ratio of about 2 and a shape factor of about 1.

12. The wind turbine of claim 1, wherein each of the radially extending members is formed of a honeycomb structure.

13. A wind turbine, comprising:
a shaft rotatable about an axis;
a plurality of hubs fixedly attached to the shaft, wherein each hub of the plurality of hubs includes at least one radially extending member, and wherein each of the radially extending members is formed of a honeycomb structure;
a plurality of vanes releasably engaged with the plurality of hubs, wherein each vane of the plurality of vanes engages with at least one of the radially extending members of at least one of the plurality of hubs,
wherein the shaft, hubs, and vanes are configured such that:
(a) rotation of the shaft about the axis creates and imparts centripetal force on the vane, and rotation of the shaft about the axis at a predetermined cutout speed of the wind turbine creates and imparts sufficient centripetal force on the vane to cause the vane to disengage from the hub, and
(b) when the vane disengages from the hub, the vane is also no longer secured to the shaft, and
(c) the plurality of vanes are configured to be engaged with the plurality of hubs, such that each vane may be re-attached to the hub after the vane has disengaged from the hub and is no longer secured to the shaft.

* * * * *